(12) United States Patent
Dal Canale

(10) Patent No.: US 12,428,236 B2
(45) Date of Patent: Sep. 30, 2025

(54) APPARATUS FOR LOADING AND ACCUMULATING SEMI-FINISHED PLATE-LIKE PIECES, IN PARTICULAR LENSES

(71) Applicant: COSTRUZIONI MECCANICHE E TECNOLOGICHE S.R.L., Venizia (IT)

(72) Inventor: Lorenzo Dal Canale, Venice (IT)

(73) Assignee: COSTRUZIONI MECCANICHE E TECNOLOGICHE S.R.L., Venice (IT)

( * ) Notice: Subject to any disclaimer, the term of this patent is extended or adjusted under 35 U.S.C. 154(b) by 220 days.

(21) Appl. No.: 18/332,441

(22) Filed: Jun. 9, 2023

(65) Prior Publication Data

US 2023/0399178 A1    Dec. 14, 2023

(30) Foreign Application Priority Data

Jun. 14, 2022    (IT) .................. 102022000012539

(51) Int. Cl.
*B65G 33/06*    (2006.01)
(52) U.S. Cl.
CPC ........ *B65G 33/06* (2013.01); *B65G 2201/022* (2013.01); *B65G 2207/08* (2013.01)
(58) Field of Classification Search
USPC ................ 198/608, 625, 418.7; 414/798.9
See application file for complete search history.

(56) References Cited

U.S. PATENT DOCUMENTS

| | | | |
|---|---|---|---|
| 4,718,202 A | 1/1988 | Worsham | |
| 5,310,043 A * | 5/1994 | Alcorn | B65G 33/06 |
| 8,573,235 B2 * | 11/2013 | Hong | A47L 15/248 |
| | | | 134/125 |

(Continued)

FOREIGN PATENT DOCUMENTS

| | | |
|---|---|---|
| JP | 10243908 A | 9/1998 |
| JP | 4515486 B2 | 7/2010 |

OTHER PUBLICATIONS

TW1441640 (Year: 2014).*

(Continued)

*Primary Examiner* — Gene O Crawford
*Assistant Examiner* — Lester Ill Rushin
(74) *Attorney, Agent, or Firm* — Merchant & Gould P.C.

(57) ABSTRACT

An apparatus for loading and accumulating semi-finished plate-like pieces, in particular lenses, includes a support structure and a piece warehouse which is associated with the support structure for moving the pieces from a piece inlet portion to a piece outlet portion along a warehouse axis. The warehouse includes augers extending parallel to the warehouse axis along respective longitudinal axes and are arranged around the warehouse axis to jointly delimit transverse seats with respect to the warehouse axis. Each seat accommodates a semi-finished plate-like piece. A system coordinates positioning of the augers for varying a distance of each auger from the warehouse axis to vary a radial dimension of the transverse seats. A system rotates each auger around the relevant longitudinal axis in a synchronized manner to cause movement of the pieces parallel to the warehouse axis from the inlet portion to the outlet portion.

21 Claims, 11 Drawing Sheets

(56) References Cited

U.S. PATENT DOCUMENTS

2007/0262675 A1    11/2007  Fan
2020/0281436 A1*   9/2020   Ang ...................... B65G 33/06

OTHER PUBLICATIONS

TW1441610 (Year: 2014).*
Italian Search Report received for Italian Application No. IT 2022 000 12539, mailed Jan. 10, 2023, 2 pgs.

* cited by examiner

APPARATUS FOR LOADING AND ACCUMULATING SEMI-FINISHED PLATE-LIKE PIECES, IN PARTICULAR LENSES

CROSS-REFERENCE TO RELATED APPLICATION

This U.S. patent application claims the benefit of Italian Patent Application No. 10 2022 000012539 filed with the Italian Patent Office on Jun. 14, 2022, the entire contents of which is incorporated herein by reference.

FIELD OF APPLICATION

The subject matter of the present invention is an apparatus for loading and accumulating semi-finished plate-like pieces, particularly lenses.

The loading and accumulation apparatus according to the invention is intended to be operationally associated with at least one machine suitable for carrying out processing on the semi-finished plate-like pieces, and is suitable in particular for feeding such a machine with the semi-finished pieces by adapting to the dimensional variability of said pieces in a flexible and rapid manner.

In particular, the loading and accumulation apparatus according to the invention is suitable for handling small pieces subject to high variability from batch to batch. The semi-finished plate-like pieces may have flat or curved surfaces and have any perimeter profile, e.g., circular, elliptical, rectangular, etc.

The apparatus according to the invention is particularly suitable for treating lenses for eyeglasses, but may also be used to process other types of pieces, such as flanges, discs, or plates.

Operationally, the apparatus according to the invention makes it possible to reduce the downtime of the apparatus in the face of production changes.

PRIOR ART

Many production lines comprise at least two consecutive piece processing/treatment stations, characterized by different operating speeds.

Generally, to avoid having the faster machining station work at the speed of the slower station, an intermediate storage apparatus (or buffer) of the semi-finished pieces is placed between the two stations, thus separating the operation of the two stations.

A typical example is the intermediate piece accumulation apparatus, positioned between a main warehouse of semi-finished pieces and a machine for processing those pieces. Due to the presence of the accumulation apparatus, it is possible to operate the device for picking pieces from the warehouse at a different operating speed from that of the processing machine. This application is particularly useful when the processing machine stops to allow a tool change. The device for transferring the pieces from the main warehouse to the machine may continue to operate without interruption by depositing the pieces to be processed in the accumulation apparatus at the inlet to said machine.

Further operative needs arise in the case where the production line is called upon to handle production batches characterized by high dimensional variability of the pieces. With each change of production batch, it in fact becomes necessary to adapt the intermediate accumulation apparatus to the dimensions of the new pieces to be processed.

Generally, the known types of loading and accumulation systems comprise mats or belts with piece positioning inserts. These known systems have several limitations, mainly related to their large footprint, low operating speed, and the complexity of setting up to accommodate the dimensional variability of the pieces.

Generally, the operation of adapting the accumulation apparatus to the dimensions of the pieces to be processed may therefore be complex and also create exceptionally long downtimes. In the case where production is based on large batches with limited dimensional variability of the pieces, the frequency of the adaptation operation is low and the impact on the production in terms of downtime is substantially negligible. Conversely, in the case where production is based instead on small batches with high dimensional variability, the frequency of this operation is high and the impact on production in terms of downtime may be quite onerous.

Added to this is the fact that in the case of treating very fragile and/or delicate pieces (such as lenses for eyeglasses), the loading and accumulation apparatus must be able to adapt very precisely to the size of the pieces to reduce the risk of mishandling and possible subsequent damage to said pieces. In this case, the adaptation operation becomes even more complicated.

As an alternative to these loading and accumulation apparatuses, robotic arms may be provided directly both when loading pieces into the processing machine and when unloading. However, the robotic arms, while very flexible, are not always able to adapt to the speed of the processing machine.

Moreover, the loading and accumulation apparatuses must ensure speeds that are as constant as possible in feeding pieces to the machine. The robotic arms are not always able to meet this operational need.

Therefore, the need is highly felt for an intermediate loading and accumulation apparatus that may quickly, reliably, and accurately adapt to dimensional variations of pieces from batch to batch so as to reduce downtime without increasing the risk of damaging the treated pieces.

Further, such an intermediate loading and accumulation apparatus must be able to ensure a piece feed rate to the downstream processing machine that is as constant as possible.

DISCLOSURE OF THE INVENTION

Therefore, the main object of the present invention is to eliminate or at least mitigate the drawbacks of the above-mentioned prior art by providing an apparatus for loading and accumulating semi-finished plate-like pieces that is quickly, reliably and accurately adaptable to dimensional variations of pieces from batch to batch.

A further object of the present invention is to provide an apparatus for loading and accumulating semi-finished plate-like pieces that may ensure a piece feed rate to a downstream processing machine that is as constant as possible.

A further object of the present invention is to provide an apparatus for loading and accumulating semi-finished plate-like pieces that is at the same time mechanically reliable.

A further object of the present invention is to provide an apparatus for loading and accumulating semi-finished plate-like pieces that is at the same time simple to construct.

BRIEF DESCRIPTION OF THE DRAWINGS

The technical features of the invention, according to the aforementioned objectives, may be clearly seen in the content of the claims below, and the advantages thereof will become more readily apparent in the detailed description that follows, made with reference to the accompanying drawings, which represent one or more purely exemplifying and non-limiting embodiments thereof, wherein:

Figure 1:
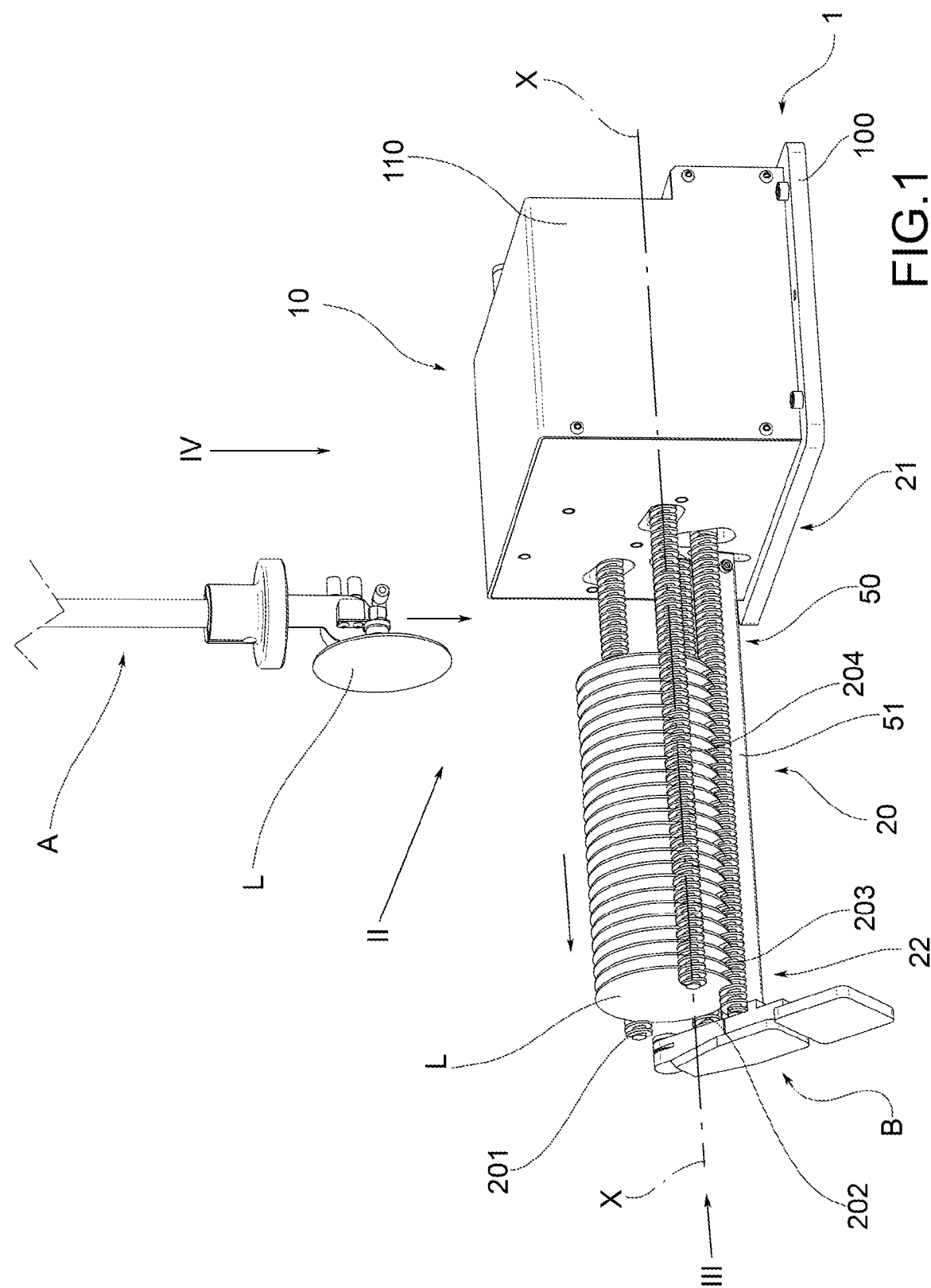
FIG. 1 is a perspective view of an apparatus for loading and accumulating semi-finished plate-like pieces according to a preferred embodiment of the invention.
Figure 2:
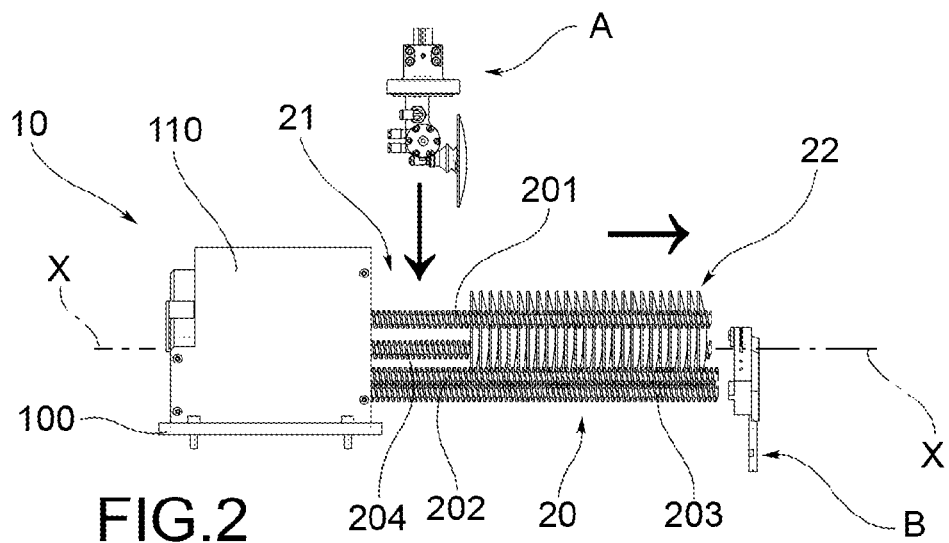
FIG. 2 is an orthogonal side view of the apparatus in FIG. 1 according to the arrow II shown therein.

Elements or parts of elements common to the embodiments described above will be indicated with the same numerical references.

DETAILED DESCRIPTION

The present invention relates to an apparatus for loading and accumulating semi-finished plate-like pieces.

The apparatus for loading and accumulating semi-finished plate-like pieces according to the invention has been denoted as a whole with 1 in the attached figures.

Here and in the following description and claims, reference will be made to the loading and accumulation apparatus in the condition of use. Therefore, any references to a lower or upper position or to a horizontal or vertical orientation should be interpreted in this sense.

The expression "plate-like piece" means a piece having two dimensions (length and width) prevailing over the third (thickness). The semi-finished plate-like pieces that may be treated by the apparatus 1 may have flat or curved surfaces and have any perimeter profile, e.g. circular, elliptical, rectangular, etc.

In particular, the loading and accumulation apparatus 1 according to the invention is particularly suitable for treating semi-finished plate-like pieces consisting of lenses L for eyeglasses. The apparatus 1, however, may also be used to treat other types of plate-like pieces, such as flanges, discs, or plates.

In accordance with a general embodiment of the invention, the apparatus 1 for loading and accumulating semi-finished plate-like pieces, particularly lenses, comprises:
  a support structure 10; and
  a piece warehouse 20.

The piece warehouse 20 is associated with said support structure 10 and is suitable for moving the pieces from a piece inlet portion 21 to a piece outlet portion 22 along a warehouse axis X.

Preferably, the operations of loading and picking the pieces L from the aforesaid warehouse 20 are automated. Operationally, as depicted in FIG. 1 to 4, the warehouse 20 is configured to receive pieces in its own inlet portion 21 from a piece loading device A (e.g., a robotic arm) and to release pieces in its own outlet portion 22 to a piece picking device B (which may be, for example, an additional robotic arm or a device operationally integrated into the processing machine arranged downstream of the apparatus 1).

Alternatively, the warehouse 20 may be manually loaded with the desired pieces L by an operator. In this case, a plurality of interchangeable loading and accumulation apparatuses 1 may be provided, configured to be operationally coupled to the processing machine. Once exhausted a load of pieces L of an apparatus 1, this apparatus may be removed and replaced by a similar, ready-to-use apparatus with a new load of pieces L.

According to a first aspect of the invention, the warehouse 20 consists of a plurality of augers 201, 202, 203, 204.

The augers 201, 202, 203, 204 all extend parallel to the warehouse axis X along respective longitudinal axes X1, X2, X3, X4 and are arranged around said warehouse axis X to jointly delimit a plurality of transverse seats 200 with respect to said warehouse axis X. Each of said seats 200 is configured to accommodate a semi-finished plate-like piece L.

Figure 25:
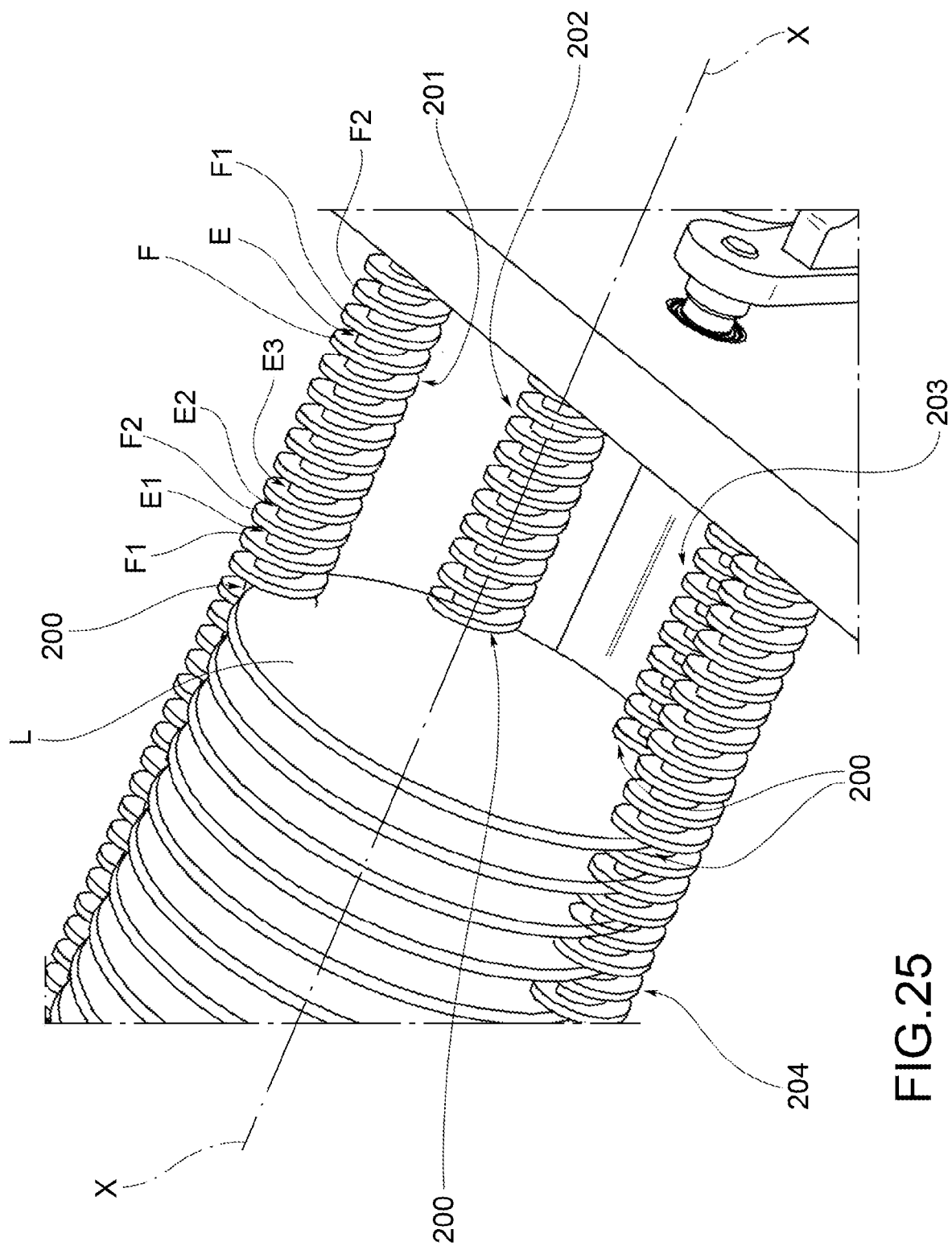
FIG. 25 is an enlargement of a detail in FIG. 12 relating to the warehouse.

More specifically, as shown in detail in FIG. 25, each auger defines, with its thread F, a helical recess E that is defined by the space between two contiguous threads F1 and F2 and extends seamlessly from a first end of the auger to a second end of the auger. Looking at the auger according to a section plane parallel to the longitudinal axis of said auger, the helical recess is defined by a series of depressions E1, E2, E3 each of which is delimited by two contiguous threads F1 and F2. As mentioned above, the augers 201, 202, 203, 204 are parallel to the warehouse axis X and therefore parallel to each other. It follows that the depressions of each auger are coplanar with the depressions of the other augers. Each of the aforesaid transverse seats 200 is defined by the depressions of the different augers lying on a specific transverse plane. In other words, every depression of each auger corresponds to a transverse seat for housing a semi-finished plate-like piece L.

Advantageously, the augers 201, 202, 203, 204 comprise at least one threaded portion (defining a worm screw) having a thread of predetermined pitch and depth as a function of the range of dimensional variability of the semi-finished pieces L that may be treated by the apparatus 1.

Figure 3:
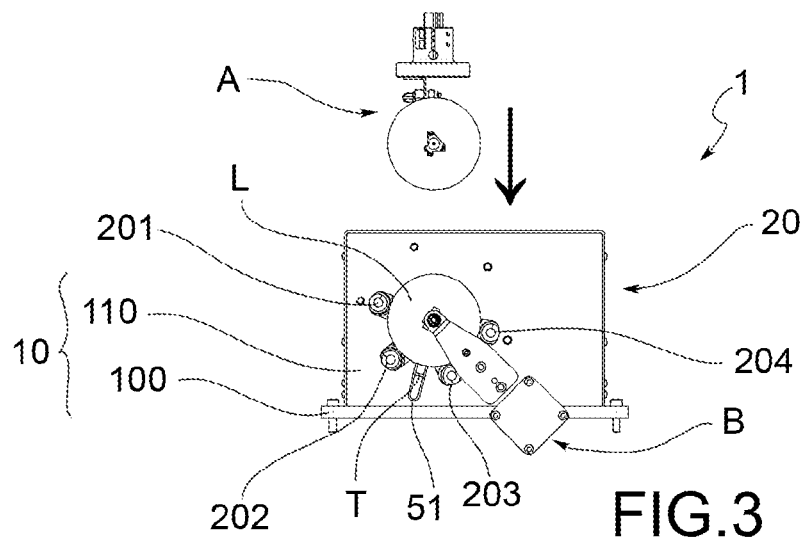
FIG. 3 is an orthogonal front view of the apparatus in FIG. 1 according to the arrow III shown therein.
Figure 4:
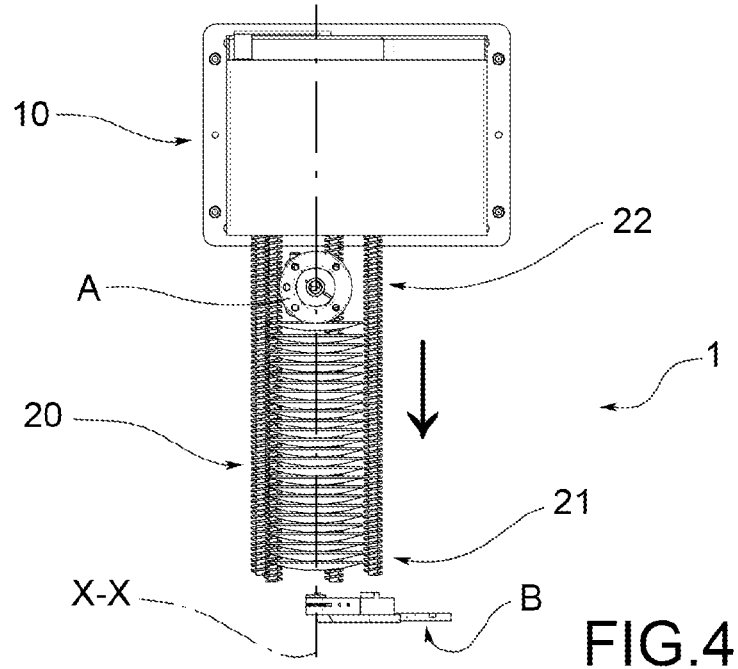
FIG. 4 is an orthogonal top view of the apparatus in FIG. 1 according to the arrow IV shown therein.
Figure 5:
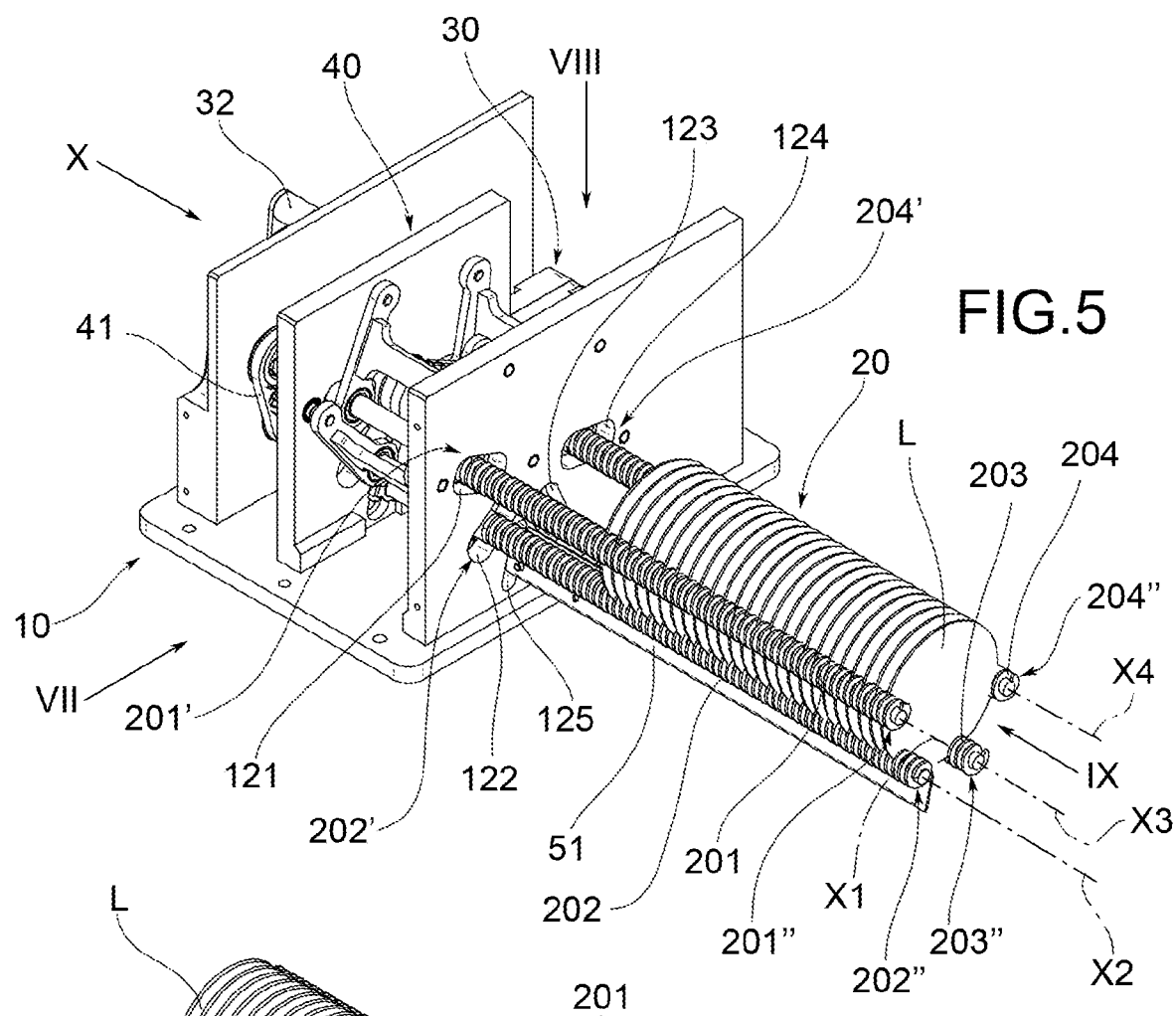
FIGS. 5 and 6 are two different perspective views of the apparatus in FIG. 1, shown with some parts removed to better highlight others.
Figure 6:
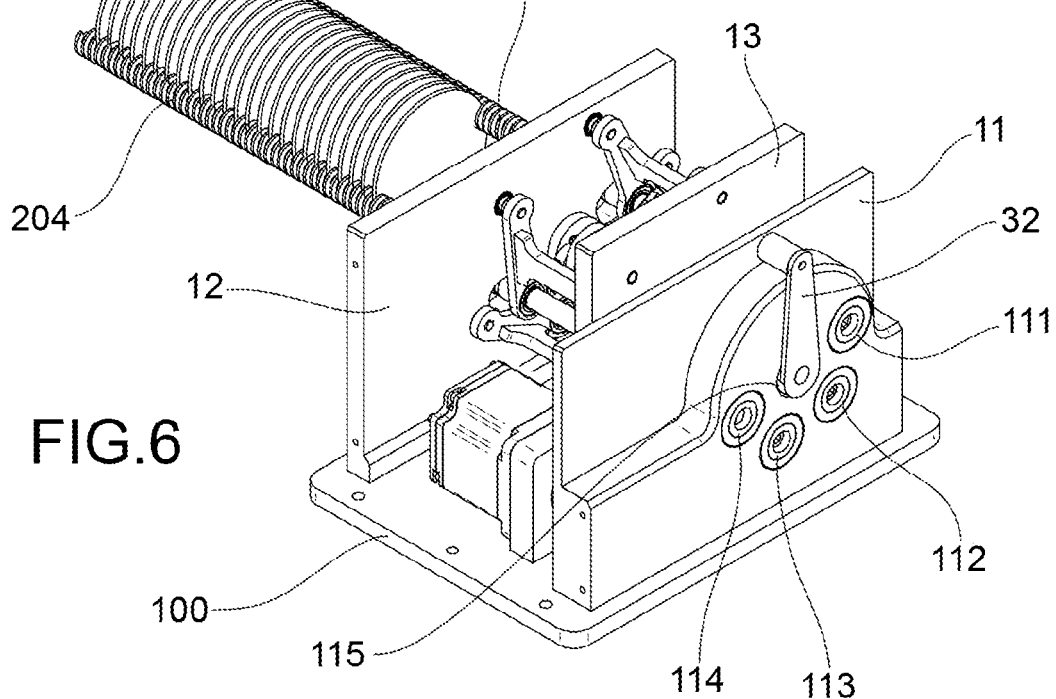
Figure 7:
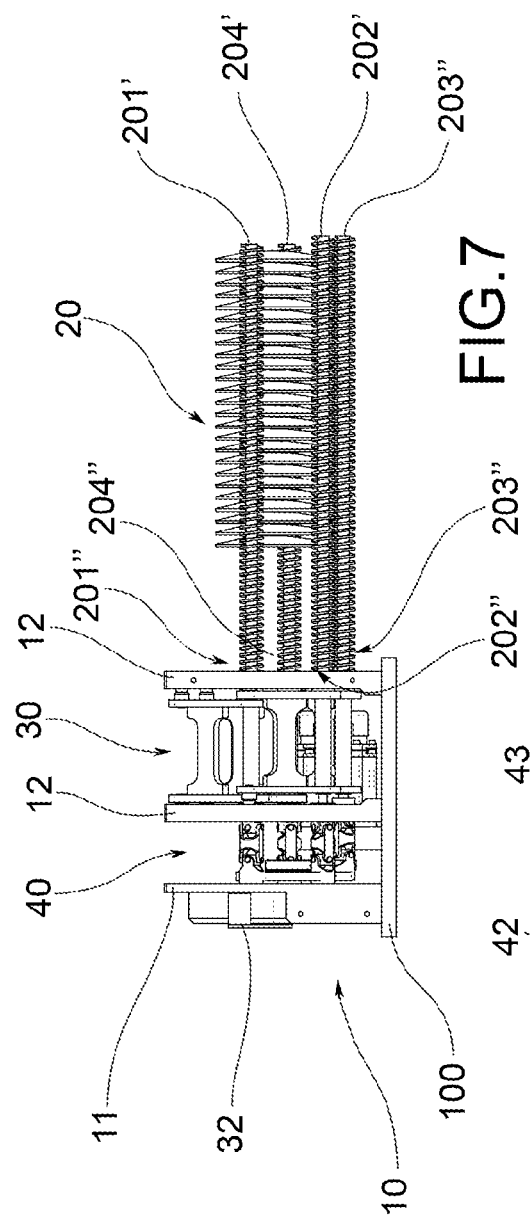
FIG. 7 is an orthogonal side view of the apparatus in FIG. 5 according to the arrow VII shown therein.
Figure 8:
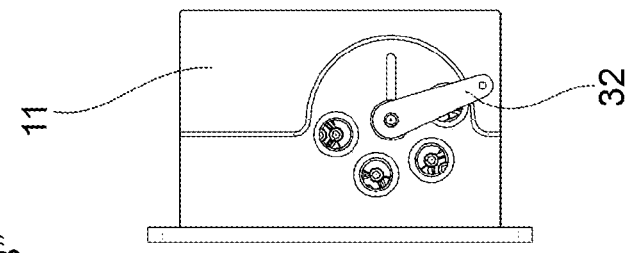
FIG. 8 is an orthogonal top view of the apparatus in FIG. 5 according to the arrow VIII shown therein.
Figure 10:
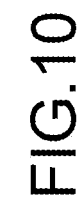
FIG. 10 is an orthogonal rear view of the apparatus in FIG. 5 according to the arrow X shown therein.
Figure 9:
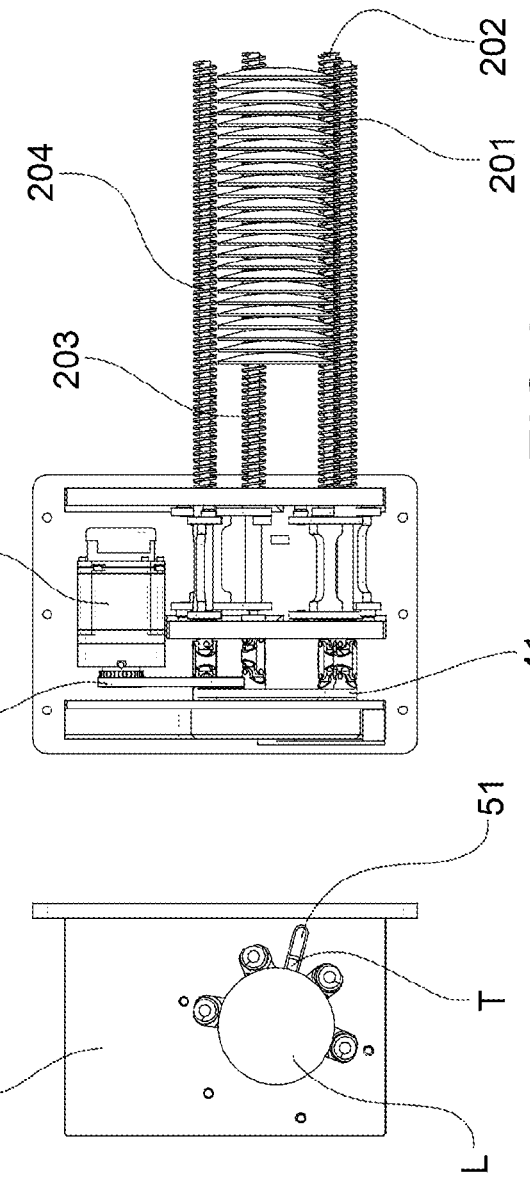
FIG. 9 is an orthogonal front view of the apparatus in FIG. 5 according to the arrow IX shown therein.
Figure 11:
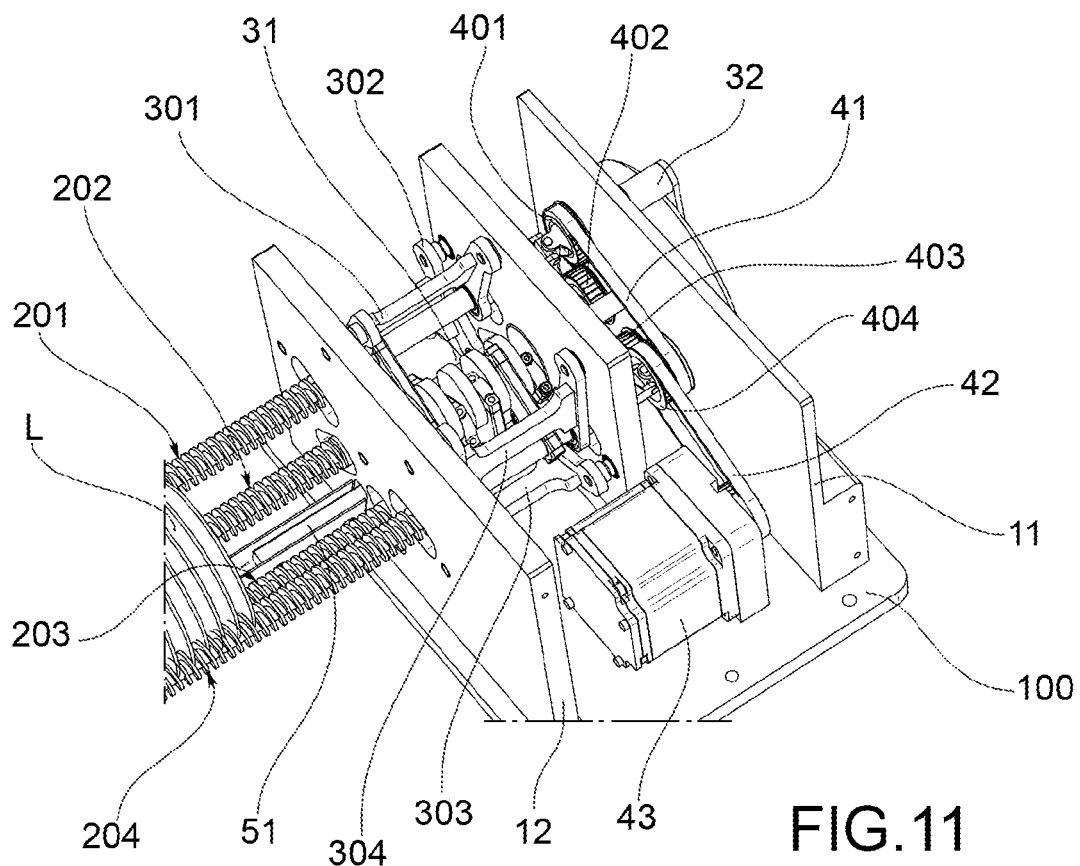
FIGS. 11, 12, 13 and 14 are four different perspective views of an enlarged detail of the apparatus in FIG. 5 relating to a system for positioning a plurality of augers and a system for rotating those augers.
Figure 12:
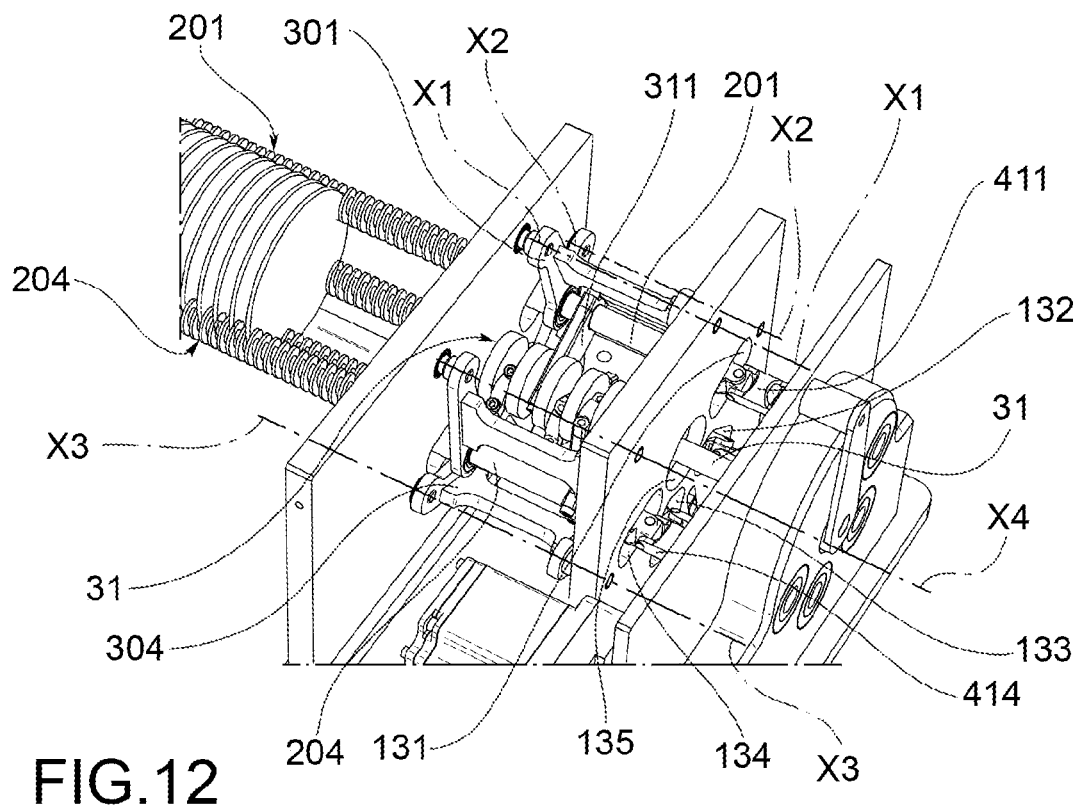
Figure 13:
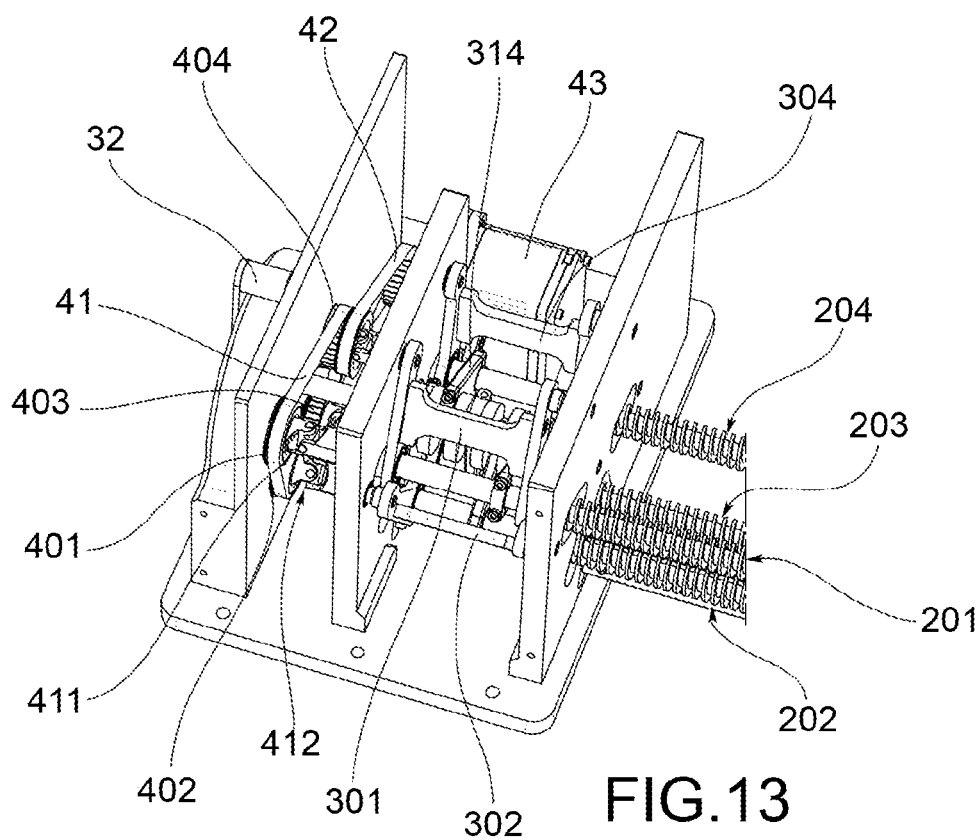
Figure 14:
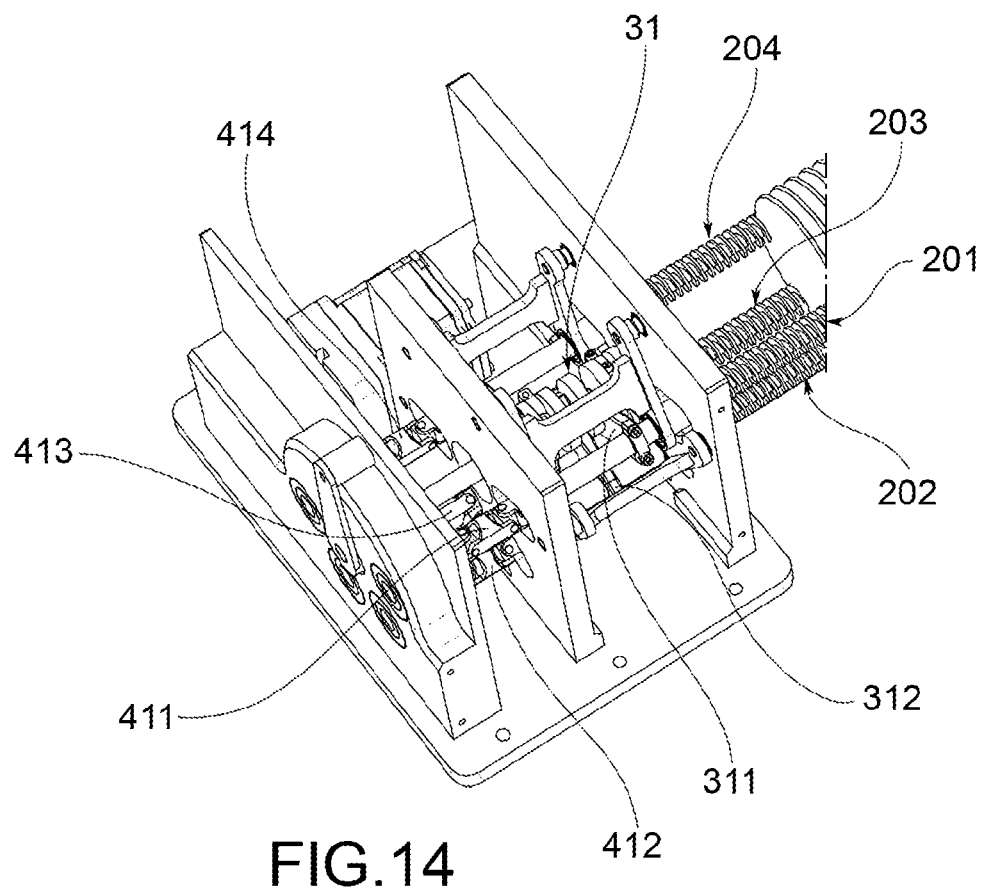

Preferably, as shown in particular in FIGS. 3, 5, and 9, the augers 201, 202, 203, 204 are arranged around the warehouse axis X, distributed along a circumference having its center in said warehouse axis X. In more detail, the augers are distributed along the lower semicircumference in such a way that one or more augers may support the pieces from below and one or more augers may support the pieces from the side. On the other hand, along the upper semicircumference, no augers are provided to allow access to the transverse seat for the vertical loading and picking of pieces within the warehouse 20.

As will be taken up in the following, according to the invention, each auger may be moved in a coordinated manner with the other augers in order to vary the distance between the augers and thus the dimensions of the transverse seats defined thereby.

The aforesaid inlet portion 21 is defined by the transverse seats located at the first end 201', 202', 203', 204' of said augers, while the aforesaid outlet portion 22 is defined by the transverse seats located at the second end 201", 202", 203", 204" of said augers.

According to a further aspect of the invention, the loading and accumulation apparatus 1 comprises:
- a system 30 for positioning said augers 201, 202, 203, 204, which system is suitable for varying the distance of each auger from said warehouse axis X in a coordinated manner with the other augers so as to vary the radial dimension of said transverse seats; and
- a system 40 for rotating each auger around the relevant longitudinal axis X1, X2, X3, X4 in a synchronized manner with the rotation of the other augers, so as to cause an advancement movement of the plate-like pieces L parallel to the warehouse axis X from said inlet portion 21 to said outlet portion 22 of the warehouse 20.

Operationally, the auger positioning system 30 allows the warehouse to be adapted (within a predetermined size range) to the dimensional variability of the semi-finished plate-like pieces L. This positioning system 30 may be operated and controlled manually or, preferably, in an automated manner via a control unit (not shown in the figures), as a function of the size of the semi-finished plate-like pieces L to be treated.

As a result of the invention, and in particular the coordinated movement of the augers during their positioning, the apparatus 1 for loading and accumulating semi-finished plate-like pieces may be adapted quickly, reliably and accurately to dimensional variations of pieces from batch to batch. This greatly reduces the downtime associated with setting up the loading and accumulation apparatus.

Operationally, the system 40 for rotating each auger allows each individual plate-like piece L to be moved parallel to the warehouse axis X in the direction going from the inlet portion 21 of the warehouse to the outlet portion 22. Due to the synchronized rotation movement of the augers, the movement of the pieces within the warehouse may be carried out reliably and easily, without subjecting the pieces contained in the warehouse to mechanical stress and strain.

Furthermore, the auger rotation system 40 makes it possible to adjust the feed rate of the pieces parallel to the warehouse axis X by controlling the rotation speed of the augers around the respective longitudinal axes X1, X2, X3 and X4. In this way, it is possible to adapt the piece feed rate to the piece disposal capacity downstream of the apparatus 1 by a piece processing machine to which said apparatus 1 is slaved. In particular, during the operation of the aforesaid piece processing machine, it is possible to ensure as constant a piece feed rate as possible, which benefits the operational continuity and regularity of said machine.

In accordance with the preferred embodiment shown in the attached figures, the aforesaid system 30 for positioning augers 201, 202, 203, 204 comprises:
- a camshaft 31 extending longitudinally parallel to said warehouse axis X, preferably along this axis;
- an oscillating mechanism 301, 302, 303, 304 for each auger 201, 202, 203, 204 that is suitable for oscillating the respective auger around an oscillation axis X1', X2', X3', X4' parallel to the warehouse axis X, supporting it with freedom of rotation around its own longitudinal axis X1, X2, X3, X4;
- a connecting rod 311, 312, 313, 314 for each auger 201, 202, 203, 204 that connects the respective auger to said camshaft 31 so that the oscillation of the auger (and thus the distance of the auger from the warehouse axis X) is controllable by the rotation of the camshaft 31; and
- means 32 for rotating said camshaft 31.

The augers are connected to the camshaft 31 at different radial positions via the respective connecting rods 311, 312, 313, 314 in such a way that a rotation of the camshaft corresponds to a radial coordinated movement of all the augers with respect to the warehouse axis X.

Advantageously, for reasons of space, the augers are connected to different axial portions of the camshaft 31.

Operationally, each angular position of the camshaft 31 corresponds to a different radial position of the augers with respect to the warehouse axis X. In this way, setting the auger positions as a function of the dimensions of the semi-finished plate-like pieces L may be easily achieved by adjusting only the angular position of the camshaft 31.

Figure 15:
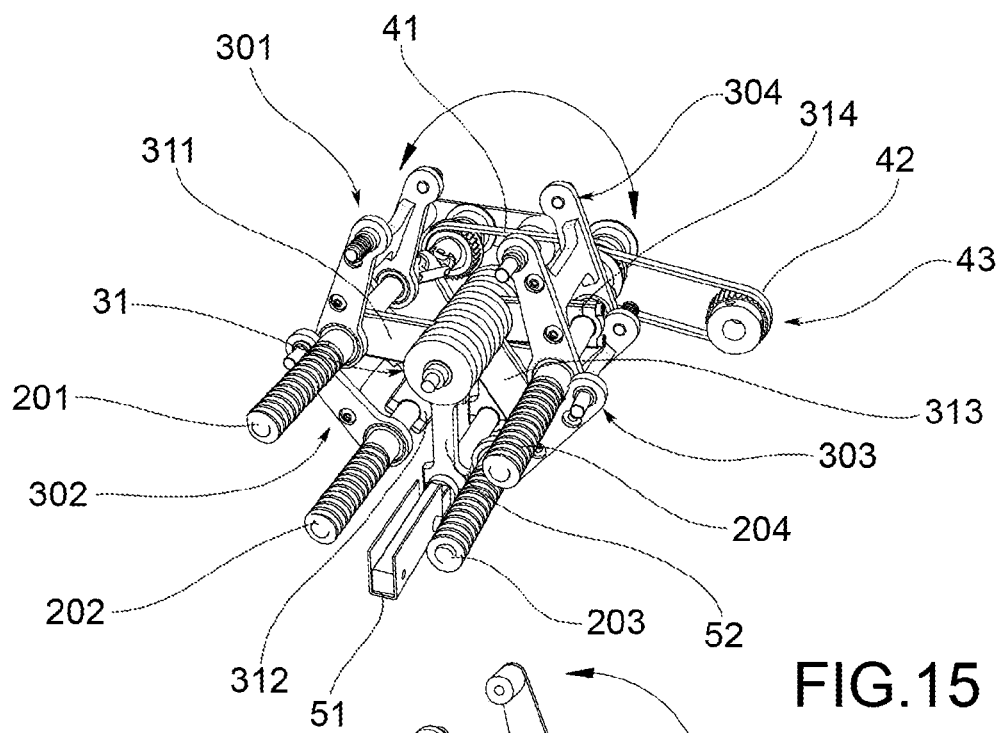
FIGS. 15, 16 and 17 are three perspective views of the system for positioning a plurality of augers and the auger rotation system in FIG. 11 through 14, shown in three different operating positions, with some parts removed to better highlight others.
Figure 16:
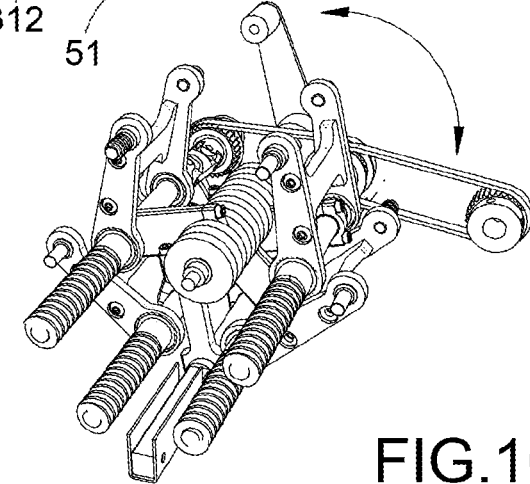
Figure 17:
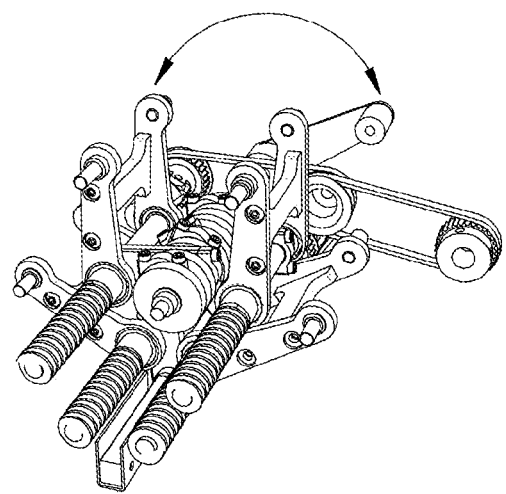
Figure 18:
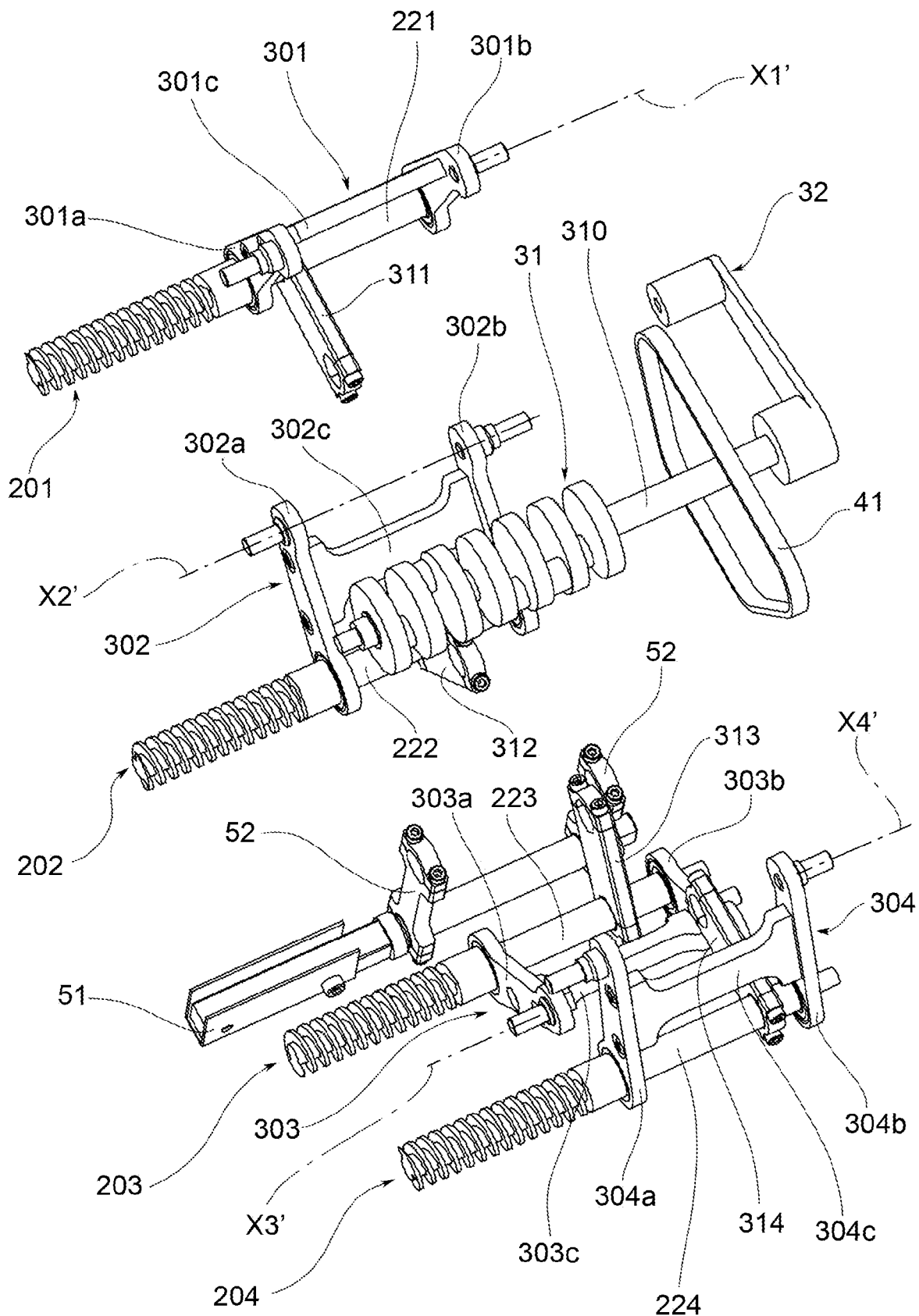
FIG. 18 is an exploded perspective view of the system for positioning a plurality of augers and the auger rotation system shown in FIG. 15 through 17.
Figure 19:
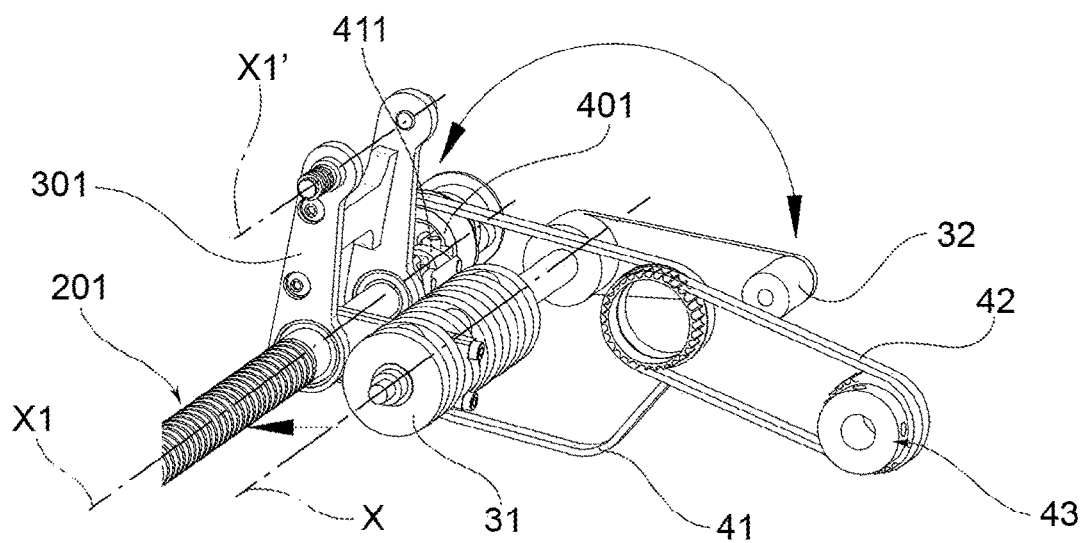
FIGS. 19, 20 and 21 are three perspective views of the positioning system and of the rotation system in FIG. 11 through 14 shown in three different operating positions and with a single auger to better highlight the movement thereof.
Figure 20:
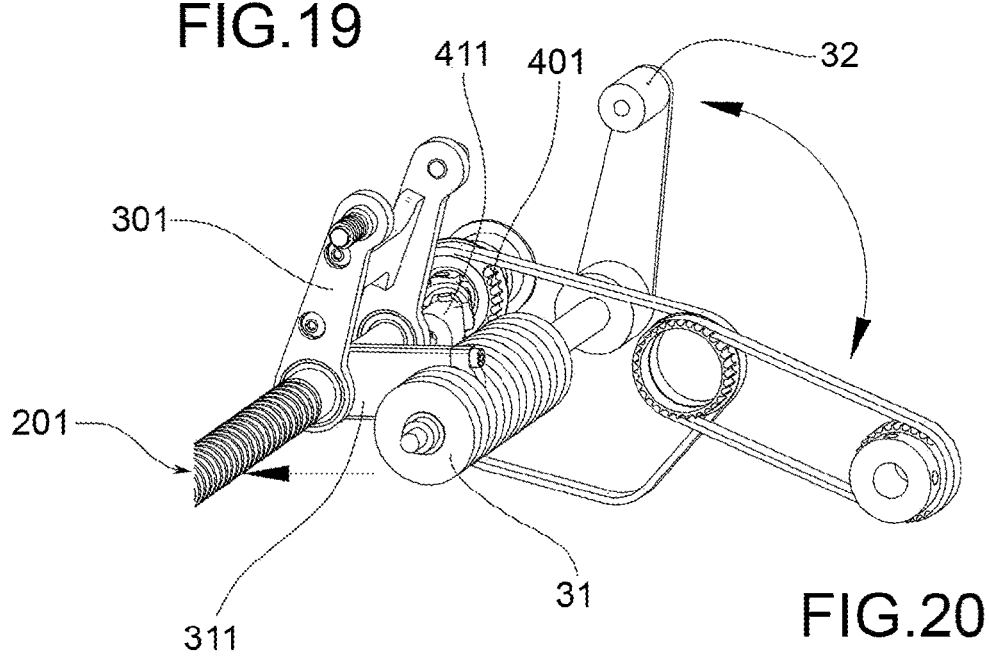
Figure 21:
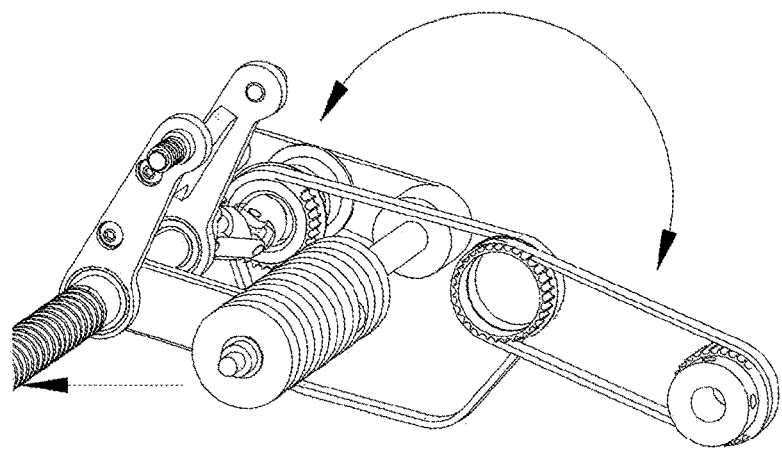
Figure 22:
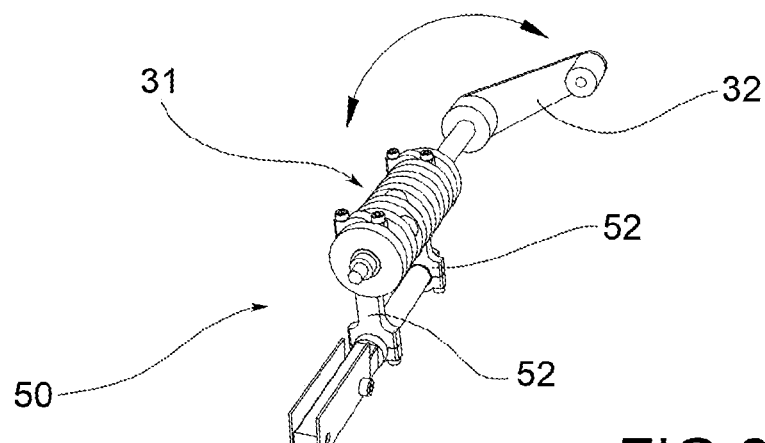
FIGS. 22, 23 and 24 are three perspective views of the positioning system in FIG. 11 through 14 shown in three different operating positions without augers, but only with a piece orientation guide.
Figure 23:
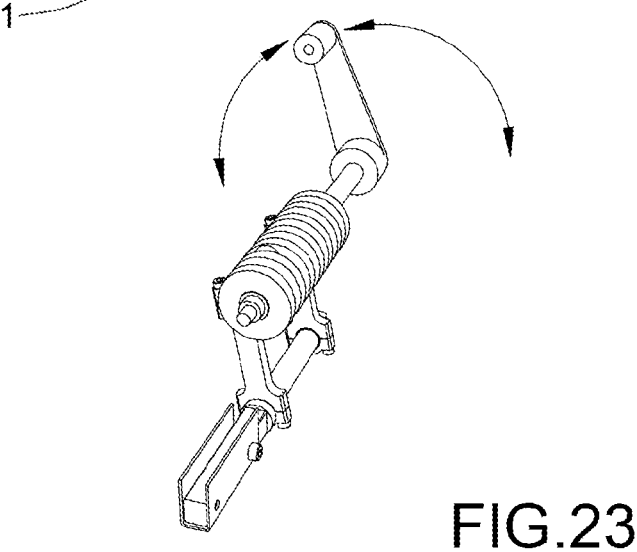
Figure 24:
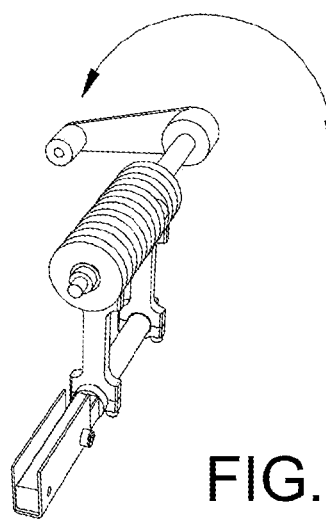

In accordance with the preferred embodiment shown in the attached figures, the means for rotating said camshaft 31 comprise a crank 32 that is rotationally integral with the camshaft 31 and is manually maneuverable. Operationally, said crank 32 allows the angular position of the camshaft to be varied, thus varying the position of the augers with respect to the warehouse axis X, as shown in the sequence of FIG. 15 to 17.

In accordance with an alternative embodiment not shown in the attached figures, the means to rotate the camshaft 31 comprise a gearmotor that is kinematically connected to said camshaft 31 and is remotely controllable. Operationally, it is possible to vary the angular position of the camshaft and thus the position of the augers with respect to the warehouse axis X by controlling the action of the gearmotor.

Preferably, as shown in particular in FIGS. 11 to 14 and 15 to 17, the oscillating mechanism 301, 302, 303, 304 of each auger 201, 202, 203, 204 comprises two levers 301a, 301b, 302a, 302b; 303a, 303b; 304a, 304b that are pivoted to said support structure 10 around the relevant oscillation axis X1', X2', X3', X4' at the first ends thereof and rotationally support, by bearings, the relevant auger around the respective longitudinal axis X1, X2, X3, X4 at the second ends thereof. Advantageously, the two levers of each oscillating mechanism may be rigidly connected to each other by a crossbar 301c, 302c, 303c, 304c, which essentially has the function of stiffening the structure of the oscillating mechanism.

Embodiments may be provided wherein the oscillating mechanism of each auger comprises a single lever. However, the presence of two levers ensures a better distribution of stresses and strains while ensuring more precise positioning of the relevant auger.

In accordance with the preferred embodiment shown in the attached figures, the aforesaid rotation system 40 comprises for each auger:
- a pulley 401, 402, 403, 404 rotationally supported by said support structure 10;
- a universal joint 411, 412, 413, 414 that kinematically connects the pulley to the respective auger so as to uncouple the fixed axial position of the pulley (with respect to the support structure 10) from the variable axial position of the auger; and
- means 41, 42, 43 for rotating the pulleys (401, 402, 403, 404) in a synchronized manner with each other.

Preferably the aforesaid means 41, 42, 43 for rotating the pulleys 401, 402, 403, 404 in a synchronized manner with each other comprise:
- a first mechanical transmission 41 which kinematically connects said pulleys 401, 402, 403, 404 together, preferably a toothed belt;
- a motor 43, preferably electric, attached to said support structure 10; and
- a second mechanical transmission 42 which kinematically connects one of said pulleys 401, 402, 403, 404 to said motor 43.

Advantageously, the aforesaid motor 43 is provided with a remotely controllable system for controlling position and speed. Thus controlling the position and the speed of the motor it is possible to control the advancement of the pieces L supported by the augers, as well as the feed rate thereof, parallel to the warehouse axis X.

In accordance with an alternative embodiment, the aforesaid rotation system 40 is not equipped with universal joints. In this case, the motor is not fixed to the support structure 10, but is supported by a carriage that slides with respect to said support structure 10 so that it is free to follow the radial movements of the augers. Also in this case, the pulleys are rotationally supported by the carriage and not by the support structure.

In accordance with a further alternative embodiment, the means for rotating the pulleys in a synchronized manner with each other comprise a motor for each auger. Each motor is controlled to be synchronized with the other motors, thus ensuring synchronized rotation of all the augers.

In accordance with the embodiment shown in the attached figures, the loading and accumulation apparatus 1 may comprise a system 50 for orienting the pieces within said warehouse 20.

Preferably, as shown in the attached figures, the aforesaid piece orientation system 50 comprises a longitudinal guide 51 that extends longitudinally parallel to the warehouse axis X and is suitable for engaging the pieces L arranged in said transverse seats to impose thereon a predetermined spatial orientation around the warehouse axis X.

In use, as shown in particular in FIG. 3, this longitudinal guide 51 is configured to engage predetermined appendages T arranged on the semi-finished pieces L.

The presence of the aforesaid piece orientation system 50 is particularly useful in the case where the apparatus 1 is configured to treat lenses for eyeglasses. Generally, in fact, the lenses for eyeglasses have an appendage T that extends from the edge of said lens and defines a reference for proper lens orientation. The longitudinal guide 51 is suitable for being engaged by said appendage of each lens, thereby orienting said lens.

Advantageously, the aforesaid longitudinal guide 51 is movable in a coordinated manner with the augers so that its position may be adapted to the dimensions of the transverse seats defined by the augers.

In accordance with the preferred embodiment shown in the attached figures and in particular in FIGS. 18 and 22-24, the aforesaid longitudinal guide 51:
- is connected by at least one connecting rod 52 to the camshaft 31 to which all the augers are connected; and
- is guidedly associated with said support structure 10 to undergo only radial translations with respect to the warehouse axis X.

Operationally, the connecting rod provides a connection between the longitudinal guide and the camshaft that transfers only straight movements, cutting off all rotational components. In this way, the longitudinal guide 51 may be subject to the guiding action of the support structure with which it is associated.

Preferably, the aforesaid longitudinal guide 51 is connected to the camshaft by two connecting rods 52 in order to support said guide more stably.

Advantageously as shown in FIG. 1 to 4, the aforesaid support structure 10 comprises:
- a base 100; and
- a containment body 110.

In particular, as shown in the attached figures, the base 100 may consist of a plate that is preferably arranged to be fixed by removable fixing means, such as screws and bolts. This simplifies the assembly and disassembly of the apparatus 1 within a production line.

This makes the apparatus 1 for loading and accumulating semi-finished plate-like pieces according to the invention easy and simple to replace in order to speed up the changeover in the case of failure of the apparatus or in the case of, due to production requirements, needing to treat special formats of semi-finished plate-like pieces that would make it necessary to replace the augers. In the latter case, it is operationally easier to replace the entire apparatus 1, exchanging it with a similar apparatus 1 already set up with the appropriate augers for handling the particular type of pieces.

The containment body 110 is associated with said base 100 and delimits therewith a technical compartment in which the system 30 for positioning said augers 201, 202, 203, 204 and the system 40 for rotating each auger are installed.

The augers 201, 202, 203, 204 extend cantilevered from said containment body 110. The portion of the augers outside the containment body 110 defines the warehouse 20.

In accordance with the preferred embodiment shown in the attached figures and in particular in FIG. 5 to 14, the aforesaid support structure 10 further comprises:
- a first wall 11 which extends vertically from said base 100 transversely to said warehouse axis X and is provided with rotational support seats 111, 112, 113, 114, and 115 for the camshaft 31 and for each of the pulleys 401, 402, 403, 404 of said augers;
- a second wall 12 which extends vertically from said base 11 transversely to said warehouse axis X and is provided with through openings 121, 122, 123, 124 for the extraction of said augers from said containment body 110.

The first wall 11 and the second wall 12 are parts of said containment body 110.

Advantageously, in the case where the apparatus 1 comprises the longitudinal guide 51 integrated into the aforesaid system 50 for orienting the pieces L, said second wall 12 is provided with an additional through opening 125 for the extraction of said longitudinal guide 51 from the containment body 110.

Functionally, said additional through opening 125 also serves as a guide to limit the movements of the longitudinal guide to translating components only, impeding rotating components on the longitudinal guide.

In particular, each of said through openings 121, 122, 123, 124, and 125 has an elongated shape according to a predetermined radial direction with respect to the warehouse axis X to allow the radial displacement of the relevant auger or the longitudinal guide.

Advantageously, the support structure 10 comprises a third wall 13 that extends vertically from said base 100 between said first wall 11 and said second wall 12 transversely to said warehouse axis X.

The aforesaid third wall 13 has the function of defining an intermediate support between the first wall 11 in the second wall 12 within the technical compartment defined internally by the containment body 110. In particular, arranged in the space between said second wall 12 and said third wall 13 are the oscillating mechanisms 301, 302, 303, 304 that support the respective augers. Each oscillating mechanism 301, 302, 303, 304 is associated with said second and third walls.

As shown particularly in FIG. 11 to 14, the augers extend from the first wall 11 to the second wall 12, from which they protrude passing through the aforesaid through openings 121-124. The augers must then pass through the third wall 13 interposed between the first and second walls. For this reason, the third wall 13 is provided with through openings 131, 132, 133, 134 for the passage of said augers.

Similarly, the camshaft 31 extends from the first wall 11 to the second wall 12 from which it is supported rotationally. The camshaft 31 must then pass through the third wall 13 interposed between the first and the second wall. For this reason, the third wall 13 is also provided with an additional through opening 135 for the passage of said camshaft 31.

Advantageously, each auger 201-204 comprises an unthreaded support portion 221, 222, 223, 224, at which each auger is associated with the relevant oscillating mechanism and at the end of which it is connected to the rotation system 40, in particular to the respective universal joint, if provided.

Advantageously, the camshaft 31 comprises a camless support portion 310 at which the camshaft 31 is associated with the means 32 suitable for making it rotate. The portion of the camshaft 31 in which the cams are provided is preferably housed between the second wall 12 and the third wall 13. The portion of the camshaft 31 that passes through the third wall 13 is formed by the camless portion.

Advantageously, the aforesaid longitudinal guide 51 is guidedly associated with said support structure 10 at said second 12 and said third wall 13.

The invention allows numerous advantages to be obtained which have been explained throughout the description.

The apparatus 1 for loading and accumulating semi-finished plate-like pieces according to the invention is quickly, reliably and accurately adaptable to dimensional changes of pieces from batch to batch. This is made possible, in particular, by the fact that each auger may be repositioned in coordination with the other augers.

Further, again due to the fact that all augers may be repositioned simultaneously and in a coordinated way, it is possible to control this operation centrally. In this way, the downtime associated with setting up the loading and accumulation apparatus for the dimensional changes in the semi-finished plate-like pieces L to be treated is reduced in an extremely significant way.

The apparatus according to the invention makes it possible to compensate for the downtimes for loading the main warehouse without interrupting the serving of the pieces to the machine by the loading and accumulation apparatus 1, the latter continuing to continuously supply pieces for processing. As soon as the main warehouse is no longer occupied by a batch of pieces for the apparatus 1, said apparatus is refilled from the main warehouse with a new batch. It is important to note that, on average, the loading time of the apparatus 1 will be less than or equal to the unloading of said apparatus (the unloading time corresponds to the positioning of the piece to be processed in the work area+the processing time comprising any tool changes, measurements or other operations). It is also important that the main warehouse downtime is no longer than the depletion time of the apparatus 1.

The apparatus 1 for loading and accumulating semi-finished plate-like pieces according to the invention may ensure as constant a piece feed rate as possible to a downstream processing machine.

In fact, the auger rotation system 40 with which the apparatus 1 is provided allows the piece feed rate to be adjusted parallel to the warehouse axis X by controlling the auger rotation speed around the respective longitudinal axes X1, X2, X3 and X4. In this way, it is possible to adapt the piece feed rate to the piece disposal capacity downstream of the apparatus 1 by a piece processing machine to which said apparatus 1 is slaved. In particular, during the operation of the aforesaid piece processing machine, it is possible to ensure as constant a piece feed rate as possible, which benefits the operational continuity and regularity of said machine.

Further, due to the synchronized rotation movement of the augers, the movement of the pieces within the warehouse may be carried out reliably and easily, without subjecting the pieces contained in the warehouse to mechanical stress and strain.

The apparatus 1 for loading and accumulating semi-finished plate-like pieces according to the invention is also mechanically reliable.

Further, the apparatus 1 for loading and accumulating semi-finished plate-like pieces according to the invention is at the same time simple to construct.

Finally, the apparatus 1 for loading and accumulating semi-finished plate-like pieces according to the invention is simply to replace in order to speed up the changeover in the case of failure of the apparatus or in the case of, due to production requirements, needing to treat special formats of semi-finished plate-like pieces that would necessitate the replacement of the augers. In the latter case, it is operationally easier to replace the entire apparatus 1, exchanging it with a similar apparatus 1 already set up with the appropriate augers for handling the particular type of pieces.

The invention thus conceived therefore achieves its intended objectives.

Obviously, in practice it may also assume different forms and configurations from the one illustrated above, without thereby departing from the present scope of protection.

Furthermore, all details may be replaced with technically equivalent elements, and the dimensions, shapes, and materials used may be any according to the needs.

The invention claimed is:

1. Apparatus for loading and accumulating semi-finished plate-like pieces, comprising a support structure and a piece warehouse which is associated with said support structure; and said piece warehouse moves the pieces from a piece inlet portion to a piece outlet portion along a warehouse axis;

wherein said warehouse comprises a plurality of augers which all extend parallel to the warehouse axis along respective longitudinal axes and are arranged around said warehouse axis to jointly delimit a plurality of transverse seats with respect to said warehouse axis, each of said seats being configured to accommodate a plate-like semi-finished piece, said inlet portion being defined by the transverse seats placed at a first end of said augers and said outlet portion being defined by the transverse seats placed at a second end of said augers; and wherein said apparatus comprises:
- a system for positioning said augers to vary a distance of each auger from said warehouse axis in a coordinated manner with the other augers of the plurality of augers to vary a radial dimension of said transverse seats; and
- a system for rotating each auger around a respective longitudinal axis in a synchronized manner with rotation of the other augers of the plurality of augers to cause movement of the pieces parallel to the warehouse axis from said inlet portion to said outlet portion;

wherein said system for positioning said augers comprises:
- a camshaft extending longitudinally parallel to said warehouse axis;
- an oscillating mechanism for each auger to oscillate a respective auger around an oscillation axis parallel to the warehouse axis, supporting the respective auger with freedom of rotation around the respective longitudinal axis;
- a connecting rod for each auger which connects the respective auger to said camshaft so that oscillation of the auger is controllable by rotation of the camshaft; and
- means for rotating said camshaft.

2. Apparatus according to claim 1, wherein said means for rotating said camshaft comprise a crank which is rotationally integral with the camshaft and is manually maneuverable.

3. Apparatus according to claim 1, wherein said means for rotating said camshaft comprise a gearmotor kinematically connected to said camshaft and remotely controllable.

4. Apparatus according to claim 1, wherein the oscillating mechanism of each auger comprises two levers hinged to said support structure around the respective oscillation axis at first ends of the respective auger, and rotationally support the respective auger around the respective longitudinal axis by bearings at second ends of the respective auger.

5. Apparatus according to claim 1,
wherein said rotation system comprises for each auger:
a pulley rotationally supported by said support structure;
a universal joint which kinematically connects the pulley to the respective auger to uncouple the fixed axial position of the pulley from the variable axial position of the auger;
means for rotating the pulleys in a synchronized manner.

6. Apparatus according to claim 3, wherein said means for rotating the pulleys in a synchronized manner comprise:
- a first mechanical transmission which kinematically connects said pulleys;
- a motor; and
- a second mechanical transmission which kinematically connects one of said pulleys to said motor.

7. Apparatus according to claim 6, wherein said motor is provided with a remotely controllable position control system.

8. Apparatus according to claim 1, comprising a system for orienting the pieces inside said warehouse.

9. Apparatus according to claim 8, wherein said piece orientation system comprises a longitudinal guide which extends longitudinally parallel to the warehouse axis and engages the pieces arranged in said transverse seats to impose a predefined spatial orientation around the warehouse axis, in use said longitudinal guide being configured to engage predefined appendages arranged on the semi-finished pieces.

10. Apparatus according to claim 9, wherein said longitudinal guide is movable in a coordinated manner with said augers.

11. Apparatus according to claim 10, wherein said system for positioning said augers comprises:
a camshaft extending longitudinally parallel to said warehouse axis;
an oscillating mechanism for each auger to oscillate the respective auger around an oscillation axis parallel to the warehouse axis, supporting the respective auger with freedom of rotation around the longitudinal axis;
a connecting rod for each auger which connects the respective auger to said camshaft so that oscillation of the auger is controllable by rotation of the camshaft; and
means for rotating said camshaft;
wherein said longitudinal guide is connected by at least one connecting rod to said camshaft and is guidedly associated with said support structure to undergo only radial translations with respect to the warehouse axis.

12. Apparatus according to claim 1, wherein said support structure comprises a base and a containment body associated with said base and delimits with said base a technical compartment in which the system for positioning said augers and the system for rotating each auger are installed, and wherein said augers extend cantilevered from said containment body.

13. Apparatus according to claim 12, wherein said system for positioning said augers comprises:
a camshaft extending longitudinally parallel to said warehouse axis;
an oscillating mechanism for each auger to oscillate the respective auger around an oscillation axis parallel to the warehouse axis, supporting the respective auger with freedom of rotation around the respective longitudinal axis;
a connecting rod for each auger which connects the respective auger to said camshaft so that oscillation of the auger is controllable by rotation of the camshaft; and
means for rotating said camshaft,
wherein said rotation system comprises for each auger:
a pulley rotationally supported by said support structure;
a universal joint which kinematically connects the pulley to the respective auger to uncouple the fixed axial position of the pulley from the variable axial position of the auger;
means for rotating the pulleys in a synchronized manner with each other; and
wherein said support structure comprises:
a first wall extending vertically from said base transversely to said warehouse axis, and is provided with rotational support seats for said camshaft and for each of the pulleys of said augers;
a second wall extending vertically from said base transversely to said warehouse axis and provided with through openings for extraction of said augers from said containment body;
wherein said first wall and said second wall are parts of said containment body.

14. Apparatus according to claim 13, comprising a system for orienting the pieces inside said warehouse;

wherein said piece orientation system comprises a longitudinal guide which extends longitudinally parallel to the warehouse axis and engages the pieces arranged in said transverse seats to impose a predefined spatial orientation around the warehouse axis, in use said longitudinal guide being configured to engage predefined appendages arranged on the semi-finished pieces;

wherein said longitudinal guide is movable in a coordinated manner with said augers;

wherein said system for positioning said augers comprises:
- a camshaft extending longitudinally parallel to said warehouse axis;
- an oscillating mechanism for each auger to oscillate the respective auger around an oscillation axis parallel to the warehouse axis, supporting the respective auger with freedom of rotation around the respective longitudinal axis;
- a connecting rod for each auger which connects the respective auger to said camshaft so that oscillation of the auger is controllable by rotation of the camshaft; and
- means for rotating said camshaft; and wherein said longitudinal guide is connected by at least one connecting rod to said camshaft and is guidedly associated with said support structure to undergo only radial translations with respect to the warehouse axis;

wherein said second wall is provided with a further through opening for extraction of said longitudinal guide from said containment body.

15. Apparatus according to claim 13, wherein each of said through openings has an elongated shape according to a predetermined radial direction with respect to the warehouse axis to allow radial displacement of the respective auger or the longitudinal guide.

16. Apparatus according to claim 13, wherein said support structure comprises a third wall extending vertically from said base between said first and said second wall transversely to said warehouse axis, and wherein each oscillating mechanism is associated with said second wall and said third wall.

17. Apparatus according to claim 16, wherein said third wall is provided with through openings for passage of said augers and said camshaft.

18. Apparatus according to claim 16, wherein said longitudinal guide is guidedly associated with said support structure at said second wall and at said third wall.

19. Apparatus according to claim 1,
wherein the augers comprise at least one threaded portion having a thread of predefined pitch and depth as a function of a range of dimensional variability of the semi-finished pieces which are treatable by said apparatus.

20. Apparatus for loading and accumulating semi-finished plate-like pieces, comprising a support structure and a piece warehouse which is associated with said support structure; and said piece warehouse moves the pieces from a piece inlet portion to a piece outlet portion along a warehouse axis;
wherein said warehouse comprises a plurality of augers which all extend parallel to the warehouse axis along respective longitudinal axes and are arranged around said warehouse axis to jointly delimit a plurality of transverse seats with respect to said warehouse axis, each of said seats being configured to accommodate a plate-like semi-finished piece, said inlet portion being defined by the transverse seats placed at a first end of said augers and said outlet portion being defined by the transverse seats placed at a second end of said augers; and wherein said apparatus comprises:
a system for positioning said augers to vary a distance of each auger from said warehouse axis in a coordinated manner with the other augers of the plurality of augers to vary a radial dimension of said transverse seats; and
a rotation system for rotating each auger around a respective longitudinal axis in a synchronized manner with rotation of the other augers of the plurality of augers to cause movement of the pieces parallel to the warehouse axis from said inlet portion to said outlet portion;

wherein said rotation system comprises for each auger:
a pulley rotationally supported by said support structure;
a universal joint which kinematically connects the pulley to the respective auger to uncouple the fixed axial position of the pulley from the variable axial position of the auger;
means for rotating the pulleys in a synchronized manner.

21. Apparatus for loading and accumulating semi-finished plate-like pieces, comprising a support structure and a piece warehouse which is associated with said support structure; and said piece warehouse moves the pieces from a piece inlet portion to a piece outlet portion along a warehouse axis;
wherein said warehouse comprises a plurality of augers which all extend parallel to the warehouse axis along respective longitudinal axes and are arranged around said warehouse axis to jointly delimit a plurality of transverse seats with respect to said warehouse axis, each of said seats being configured to accommodate a plate-like semi-finished piece, said inlet portion being defined by the transverse seats placed at a first end of said augers and said outlet portion being defined by the transverse seats placed at a second end of said augers; and wherein said apparatus comprises:
a system for positioning said augers to vary a distance of each auger from said warehouse axis in a coordinated manner with the other augers of the plurality of augers to vary a radial dimension of said transverse seats; and
a system for rotating each auger around a respective longitudinal axis in a synchronized manner with rotation of the other augers of the plurality of augers to cause movement of the pieces parallel to the warehouse axis from said inlet portion to said outlet portion;
wherein the augers comprise at least one threaded portion having a thread of predefined pitch and depth as a function of a range of dimensional variability of the semi-finished pieces which are treatable by said apparatus.

* * * * *